US008303823B1

United States Patent
Skandan et al.

(10) Patent No.: US 8,303,823 B1
(45) Date of Patent: Nov. 6, 2012

(54) USE OF NANOSCALE PARTICLES (NANOADDITIVES) WITH CATIONIC POLYMERS TO ENHANCE CONDITIONING AND DEWATERING OF SLUDGE

(75) Inventors: Ganesh Skandan, Easton, PA (US); Runqing Ou, Bridgewater, NJ (US); Rajagopalan Ganesh, Portola Hills, CA (US)

(73) Assignees: NEI, Corp and Kennedy, Piscataway, NJ (US); Jenks Consultants Inc., San Francisco, CA (US)

( * ) Notice: Subject to any disclaimer, the term of this patent is extended or adjusted under 35 U.S.C. 154(b) by 340 days.

(21) Appl. No.: 12/702,416

(22) Filed: Feb. 9, 2010

Related U.S. Application Data

(60) Provisional application No. 61/207,147, filed on Feb. 9, 2009.

(51) Int. Cl.
- *B01D 21/00* (2006.01)
- *B01D 21/01* (2006.01)
- *C02F 1/52* (2006.01)
- *B03D 3/00* (2006.01)
- *C02F 1/72* (2006.01)

(52) U.S. Cl. ........ 210/727; 210/721; 210/723; 210/758; 210/749

(58) Field of Classification Search .................. 210/607, 210/727, 702, 723, 726, 721, 758, 749, 600
See application file for complete search history.

(56) References Cited

U.S. PATENT DOCUMENTS

| | | | | |
|---|---|---|---|---|
| 4,820,645 A | * | 4/1989 | Field et al. | 436/55 |
| 2006/0047045 A1 | * | 3/2006 | Oda et al. | 524/430 |

OTHER PUBLICATIONS

Wang et al., 2007, NPL, "Sludge conditioning by using alumina nanoparticles . . . ", Water Science & Tech vol. 56 No. 8 pp. 125-132.*
Zall, J., Galil,N. And Rehbun, M. 1987. Skeleton Builders for Conditioning Oil Sludge. J. Water Pollution Control Federation 59(7):699-706.
Benitez, J., Rodriguez, A. and Saurez, A. 1994. Optimization Technique For Sewage Sludge Conditioning with Polymer and Skeleton Builders. Water Research 28(10):2067-2073.
Wang, Z.S.,et al. 2007. Sludge Conditioning by Using Alumina Nanoparticles and Polyelectrolyte. Water Science and Technology. 56(8): 125-132.
Andersson, K. and Lindgren,E. 1996. Important Properties of Colloidal Silica in Microparticulate Systems. Nordic Pulp and Paper Research Journal. 11(1): 15-21.

* cited by examiner

*Primary Examiner* — Christopher Upton
*Assistant Examiner* — Nader Hossain
(74) *Attorney, Agent, or Firm* — William L. Botjer

(57) ABSTRACT

Nanoscale additives and methodology for their use during polymer-aided sludge dewatering to increase the dewatering efficiency compared to traditionally used polymer-only dewatering processes. The nanoscale additive increases the percent solids in the dewatered cake compared to polymer-only treatment. When the nanoscale additives are added, the centrifugal force (shear) required to obtain high percent solids can be significantly reduced and the optimum polymer dose required for effective dewatering is also significantly reduced.

13 Claims, 5 Drawing Sheets

USE OF NANOSCALE PARTICLES (NANOADDITIVES) WITH CATIONIC POLYMERS TO ENHANCE CONDITIONING AND DEWATERING OF SLUDGE

REFERENCE TO RELATED APPLICATIONS

This application claims the priority of U.S. Provisional patent application Ser. No. 61/207,147 filed Feb. 9, 2009; the disclosure of which is hereby incorporated by reference.

BACKGROUND OF THE INVENTION

This invention relates to the use of certain nanoscale (i.e. less than 100 nm) particles (nanoadditives) in conjunction with cationic polymers to enhance conditioning and dewatering of digested and waste return activated sludge.

Approximately 10 to 25% of the overall energy use in water and wastewater treatment is utilized for various sludge handling processes. Sludge generated in wastewater treatment is typically thickened, digested, and then dewatered prior to offsite disposal. In some cases, the dewatered sludge is either incinerated on-site or further thermally dried and hauled offsite. The solids content of the thickened sludge is about 3 to 5%, which is ultimately increased to over 30% after sludge dewatering/drying activities. Various cationic polymers (e.g. quaternary ammonium) and/or conditioning aids (e.g. ferric chloride) are added to enhance the process/energy efficiency of sludge dewatering process.

Cationic polymers are reported to impact efficiency of sludge dewatering processes by i) neutralizing the negative charge of sludge solids to generate a sludge with higher percent solids, ii) reducing shearing of sludge in the dewatering (centrifuge, belt filter press) equipment, and iii) retaining/releasing the volatile fraction of sludge solids thereby impacting the auto-thermal characteristics.

The dewatered sludge is often hauled to an off-site location for ultimate disposal. The sludge hauling cost can constitute to over 50 to 70% of the overall sludge treatment/disposal cost. Increasing the % solids of the dewatered sludge (through polymer treatment) has a huge impact on sludge disposal cost. For example, increasing the percentage solids of the dewatered sludge from 25 to 30% can lower the sludge volume by 17% and lower the overall sludge handling cost by up to 12%.

The polymer-aided sludge dewatering is carried out using mechanical devices like belt-filter presses, as well as low, medium or high shear centrifuges. A recent survey by North East Biosolids and Residuals Association (NEBRA) indicated about 65% of the mechanical devices used in the United States are high shear centrifuges due to the higher percent solids (hence, lower mass) produced during dewatering by these devices.

While centrifuges produce high solids containing sludges (thereby lowering the sludge mass that requires disposal) recent studies have shown that high shear centrifuges release more bioavailable protein from sludge solids during the dewatering process. The bioavailable proteins are found to be a major source of odor causing compounds (e.g. volatile organic sulfur and volatile aromatic compounds) in the land applied sludges. Additionally, the energy demand for high shear centrifuges can be about an order of magnitude higher than that of dewatering using low shear or belt-filter press devices.

The type and dosage of polymer required for optimum dewatering in high shear or other dewatering devices is significantly impacted by the variability in sludge characteristics and dewatering equipment. Although polymers have been used for dewatering for several decades, and several hypotheses have been proposed on the role of polymers, to date the mechanism of polymer interactions for sludge dewatering has not been fully understood. A lower than optimum dose of polymer addition will generate a dewatered sludge with low percentage solids, and higher than optimum polymer addition may release more volatile fraction of the sludge solids.

Despite a large number of studies performed to date on polymer-aided sludge dewatering, one major area that has not been adequately addressed is the role of sub-micron and nanoscale particles. This includes (i) the fate of nanoscale biogenic suspended solid particles in the sludge, as well as (ii) the role of nanoscale dewatering aids to improve sludge conditioning. It is generally well known that due to their extremely smaller size, the biogenic sub-micron and nanoscale particles are not effectively captured in low shear (e.g. <1500 G) centrifuge devices, and require high shear (e.g. 2000 to 4000 G) centrifuging for effective dewatering.

The present invention is directed to the use of nanoscale additives during polymer-aided dewatering to increase the dewatering efficiency compared to traditionally used polymer-only dewatering processes. The use of nanoscale additive increases the percent solids in the dewatered cake compared to polymer-only treatment. Further, when nanoscale additives are added, the centrifugal force (shear) required to obtain high percent solids can be significantly reduced. In addition, the optimum polymer dose required for effective dewatering is also significantly reduced when nanoscale additives are added for dewatering.

Although it has been known that addition of fine particles can improve dewatering during polymer-aided dewatering, the fine particles used for this application are often inert substances (e.g. fly ash and cement kiln dust, which are micron scale particles) used to lower the specific resistance of dewatering by forming more porous and incompressible cake structure during dewatering. Hence, these fine particles are referred to as "skeleton builders" (See Zall, J., Galil, N. and Rehbun, M. 2001987. Skeleton Builders for Conditioning Oil Sludge. J. Water Pollution Control Federation 59(7):699-706 and 11. Benitez, J., Rodriguez, A. and Saurez, A. 1994. Optimization Technique For Sewage Sludge Conditioning with Polymer and Skeleton Builders. Water Research 28(10): 2067-2073.). However, for effective dewatering using skeleton builders a large amount of fine particles (sometimes as high as 5 kg of skeleton builders for each kg of sludge) may be required. This generates significantly large amounts of dewatered solids, rather than lowering the solids required to be hauled as found with the nanoadditive-aided dewatering. Furthermore, skeleton builders are used as inert additives with no known charge specific mechanism of action with the sludge constituents. Secondly, skeleton builders are not known to lower the extent of centrifugation required for dewatering. The present invention concerns development of a nanoparticle additive that can improve the sludge dewatering process by increasing the solids content, lowering the centrifugation, and lowering the optimum polymer dose.

In one study, researchers from National Taiwan University of Science and Technology evaluated the use of alumina sub-micron sized particles for sludge dewatering (See Wang, Z. S., et al. 2007. Sludge Conditioning by Using Alumina Nanoparticles and Polyelectrolyte. Water Science and Technology. 56(8): 125-132). They reported improvement in dewatering performance (reduction in CST and specific rate of filtration) through the use of these additives when used along with cationic polymers. However, the sub-micron sized additives used by these researchers are significantly larger (139.5 nm to 326.4 nm) than the ones used in our work.

Further, their data conflict with our findings that larger size nanoparticles did not improve dewatering significantly.

Also, the paper industry has used nano (colloidal) silica to improve retention and drainage characteristics during pulp and paper manufacturing (See Andersson, K. and Lindgren, E. 1996. Important Properties of Colloidal Silica in Microparticulate Systems. Nordic Pulp and Paper Research Journal. 11(1): 15-21). However, these additives have not been used for wastewater sludge treatment. Further, the nanosilica materials used by the paper industry are negatively charged. Use of negatively charged nanosilica did not improve sludge dewatering in our studies.

SUMMARY OF THE INVENTION

The nanoadditive-aided dewatering process, according to the present invention, involves addition of the certain specific types of nanoscale particles along with conventional polymers during dewatering. More specifically, the nanoscale particles need to be added prior to the addition of the polymers, for the dewatering process to be most effective. The specific characteristics of the nanoparticles referenced above include a net positive charge and the particles need to be within a certain size range. The positive charge and the size of nanoscale additives facilitate the removal of biogenic submicron/nanoscale particles in the sludge and hence, lower the polymer dose and centrifugation speed required for traditional sludge dewatering processes. Furthermore, the nanoscale additives can improve structural characteristics (more porous and incompressible cake structure) and improve dewatering performance. FIG. 1 shows a comparison of the concentration of submicron particles in the supernatant from traditional dewatering process, and from nanoparticle-aided dewatering. The sub-micron particles count in the untreated sludge is also shown for comparison. The traditional sludge dewatering removed nearly 65% of the submicron size particles in the supernatant. However, the nanoadditive removed more than 90% of the sub-micron particles that were not removed in the traditional approach. FIG. 2 compares percent solids in the dewatered cake after dewatering by (i) the traditional method at high centrifugation rate (500 rpm for 30 seconds in the equipment used in the lab), (ii) the traditional method at lower centrifugation rate (200 rpm for 30 seconds, followed by 45 rpm for 90 seconds in the equipment used in the lab), and (iii) the addition of nanoscale particles (200 rpm for 30 seconds) in conjunction with the same amount of polymer addition (200 rpm for 30 seconds, followed by 45 rpm for 90 seconds) as above. Clearly, the addition of the nanoscale particles yielded the same percent cake solids at lower centrifugation rate as that of the polymer-only traditional dewatering at higher centrifugation rate. The polymer only treatment, at lower centrifugation rate yielded significantly lower percent solids in the dewatered cake.

These features suggest that the nanoadditive-aided treatment is well suited to be used for sludge dewatering to lower centrifugation speed, improved solids content and a reduced amount of optimum polymer dose. Consequently, the new technology has the potential to significantly reduce the energy demand for centrifugation and mass of sludge that needs to be hauled off-site for disposal.

BRIEF DESCRIPTION OF THE DRAWINGS

While the preferred embodiments of the invention have been illustrated and described in the drawings to follow, it will be clear that the invention is not limited to these embodiments only. Numerous modifications, changes, variations, substitutions, and equivalents will be apparent to those skilled in the art without departing from the spirit and scope of the invention as described in the claims:

DESCRIPTION OF THE PREFERRED EMBODIMENTS

The present invention is directed to a nanoscale additive aided sludge dewatering process, carried out in the presence of polymeric dewatering aids, which lowers the needed centrifugation speed, increases the percent solids and lowers the required polymer demand. The nanoadditives are designed to have a net positive charge and within an optimum size range to be most effective.

The improved dewatering performance of the nanoscale additive aided dewatering process is attributed to the effective capture of sub-micron/nanoscale biogenic particles and providing optimum cake structure for dewatering. In the traditional dewatering process, in the absence of a nanoscale additive, a higher centrifugation speed and higher polymer dose are required to capture these smaller particles. The net positive charge, smaller size and higher surface area of the nanoscale additives facilitate the capture of these submicron/nanoscale particles by the nanoscale additives and subsequent incorporation into the cake solids. The present invention shows that this effective capture occurs even at lower centrifugation speed (than what is conventionally used) and lower polymer dose.

In one embodiment, the nanoscale additives used in this invention include aluminum oxide nanoparticles of a size of about 40 nm or less. These nanoparticles have a net positive charge on their surfaces at dewatering conditions as indicated by a positive Zeta potential value measured (10-20 mV). The methodology according to present invention can be applied to nanoparticles of ferric oxide, magnesium oxide, zinc oxide, manganese oxide, copper oxide, as well as cationic clay, as long as there is net positive charge on the nanoparticles, and their sizes are maintained in the optimum range; which is generally well below 100 nm, preferably 40 nm and below and more preferably in a range of 1-30 nm. The loading level of nanoparticles should be in the range of 0-4 wt % of the solid sludge content.

Figure 7:
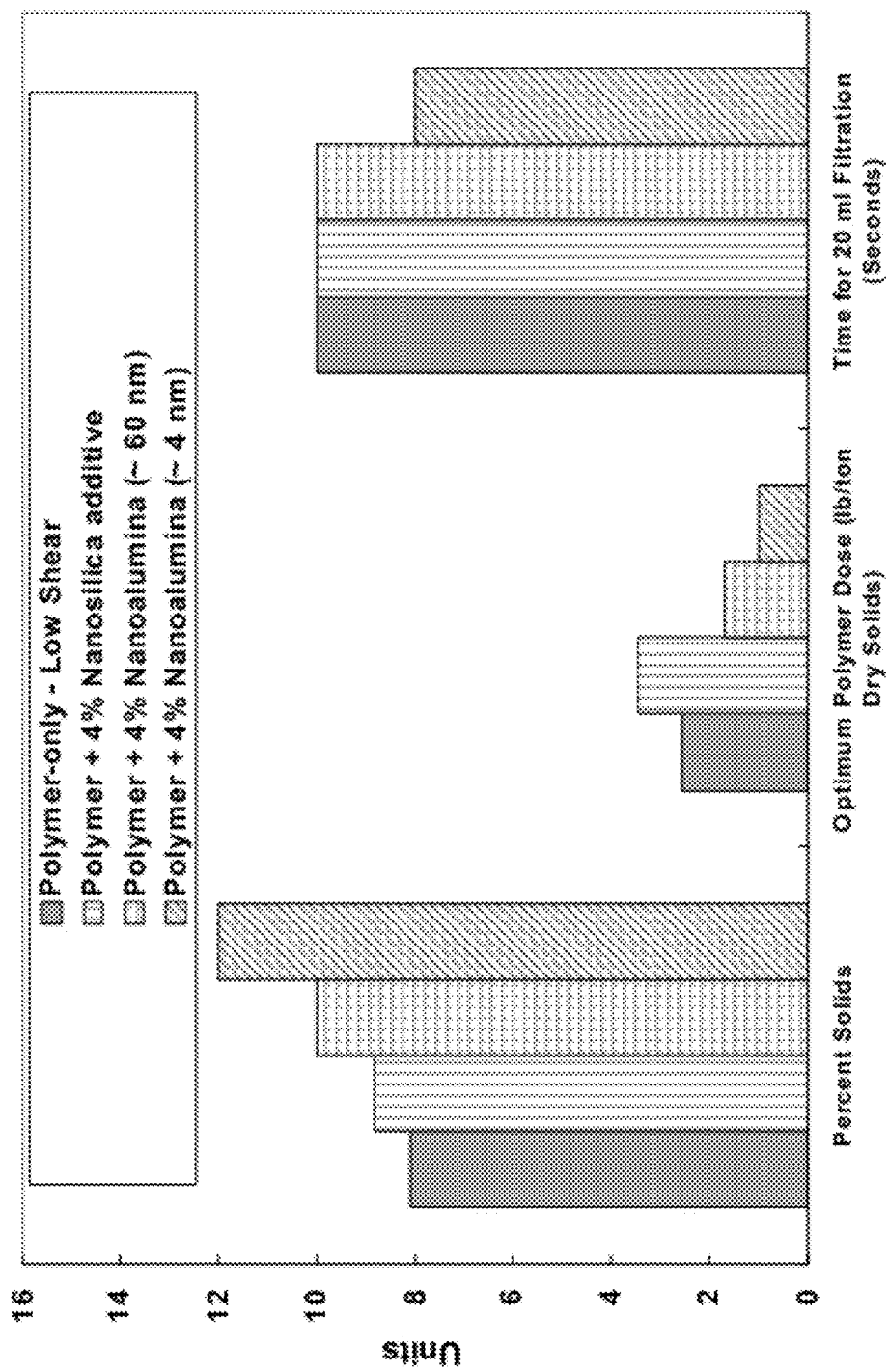
FIG. 7 shows the dewatering performance (percent solids of dewatered cake, optimum polymer dose (OPD), filtration time) of dewatering return activated sludge using polymer-only treatment, and a negatively charged nanoadditive (nanosilica), positively charged nanoalumina (~60 nm) and a positively charged nanoalumina (~4 nm). The positively charged, smaller size nanoalumina yielded the best dewatering effects.
Figure 8:
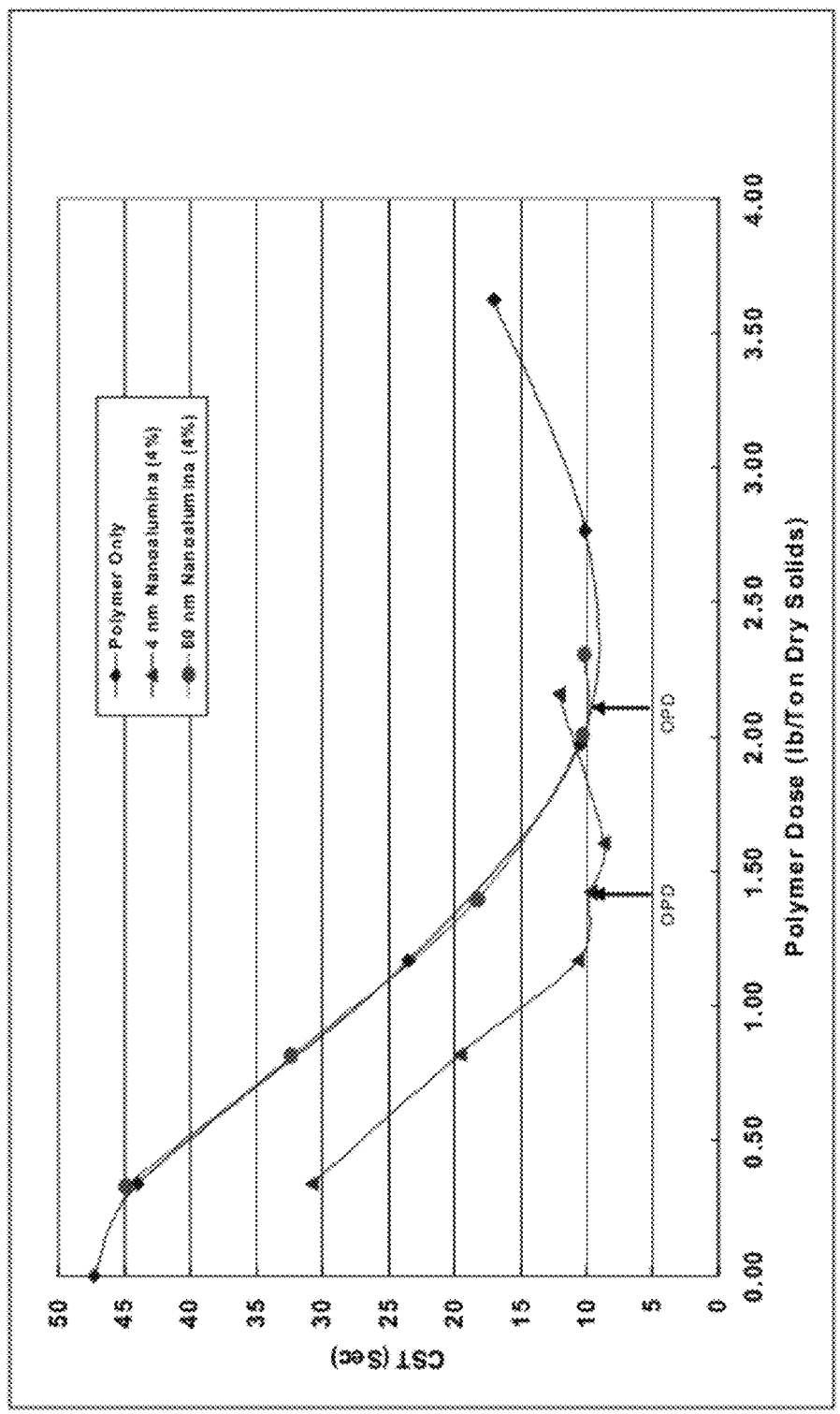
FIG. 8 shows optimum polymer dose estimation for settled return activated sludge using polymer only treatment and two different sizes of nano alumina additives along with the polymer. Compared to polymer-only dewatering performance, the larger size (~60 nm) nano alumina did not significantly improve the optimum polymer dose. However, the smaller size nano additive (approximately 3-5 nm) lowered the polymer dose by about 33%.

Low shear dewatering studies were also performed using negatively charged nanoadditives (e.g. nano silica, nano bentonite). FIG. 7 shows the dewatering data using negatively charged nanosilica, followed by polymer addition during low shear dewatering of return activated sludge. No significant improvement in dewatering performance was observed as indicated by the percent solids in the dewatered cake, optimum polymer dose and filtration time data of the polymer-only and nanosilica+polymer treatments. Nano aluminum oxides of two different average sizes were also used for dewatering using the same protocol (low shear). While, the larger size nanoalumina slightly improved the dewatering performance (increase in percent solids, decrease in polymer dose), the dewatering performance of smaller size (~4 nm) nanomaterial was significantly better than the larger size nanoalumina (FIG. 7). Also, in yet another test, the optimum polymer dose for dewatering settled return activated sludge using the smaller (~4 nm) and larger size (~60 nm) alumina particles was determined (FIG. 8). The additives and polymers were mixed under the low shear dewatering conditions. The optimum polymer dose (i.e. the dose that yielded the lowest CST) for the polymer-only treatment was about 2.1 lb/ton dry solids. Use of the larger size (~60 nm) alumina additives (4% by weight) along with the polymer didn't lower the optimum polymer dose significantly. However, the same amount of the smaller nanoadditives lowered the optimum polymer dose to about 1.4 lb/ton dry polymer. These data indicate that i) the nanoadditives have to have a net positive charge, and ii) have an optimum size range for best dewatering performance.

The proper steps in sludge treatment using nanoparticles are listed as follows;
1—Add nanoparticles to sludge and mix
2—Add polymer to sludge, mix and centrifuge
3—Separate the supernatant

EXAMPLES

Example 1

An alumina nanoparticle dispersion was synthesized by dissolving 24.1 grams of Aluminum Chloride Hexahydrate (Aldrich 237078) in 500 mL of distilled water and stirred. A 0.25 M Sodium hydroxide solution was made using 10 grams of Sodium Hydroxide (Alfa S-31803) and 500 mL of distilled water. The Aluminum Chloride solution was then heated to 80° C. using a hot plate while continuously stirring. Once 80 degrees was reached, the sodium hydroxide solution was added via peristaltic pump at a rate of 5 cc/min. The solution remained stirring while sodium hydroxide was being added. After all of the sodium hydroxide was added, the solution was left stirring and cooled down. The final pH of the material was 4. The sizes of the nanoparticles in the solution in this example and those to follow were less than 5 nm and the nanoparticle dispersion appears as a transparent liquid since the nanoparticles were too small to scatter light. These nanoparticles also have a net positive charge that prevent them form aggregating.

Anaerobic digested sludge was collected from Selinsgrove, Pa. wastewater treatment plant. The percentage solids in the digested sludge was approximately 1.2%. The sludge samples were used within seven days of their collection.

Initial tests were performed to mimic traditional high shear dewatering in laboratory scale studies. Polymer stock was prepared by adding 5.2 g of cationic polymer (Ciba ZETAG® 8818) to 1000 g of RO water. A 0.9 wt % dispersion of nanoparticles of alumina was used. To replicate traditional dewatering approach, polymer was added to 500 ml of sludge to yield a predetermined optimum dose of 22 lb/ton of dry solids. The polymer was mixed with the sludge at 500 rpm for 30 seconds. Subsequently, 50 mL of sludge sample, mixed with various concentrations of additives and optimum dose of polymer was poured into the filtration apparatus, and a vacuum was immediately applied. The volumes filtered were recorded as a function of time until the free water was completely removed. For the nanoadditive treatment, nanoscale additives from the stock suspensions were added to yield a concentration of 1% (of the dry solids in the sludge) and mixed at 500 rpm for 10 seconds, prior to the addition of polymer (~22 lb/dry ton of solids) which was mixed at 500 rpm for 30 seconds. Subsequently, 50 ml of the sludge was vacuum filtered and the supernatant was analyzed for biogenic submicron/nanoscale particle count.

The biogenic nanoscale particle count in the filtrate was analyzed using a Beckman Coulter N4 Plus Particle Size Analyzer. To estimate the particle count in a given volume of filtrate, the filtrate was directly transferred to a clean cell and the particle count was read from the machine.

Figure 1:
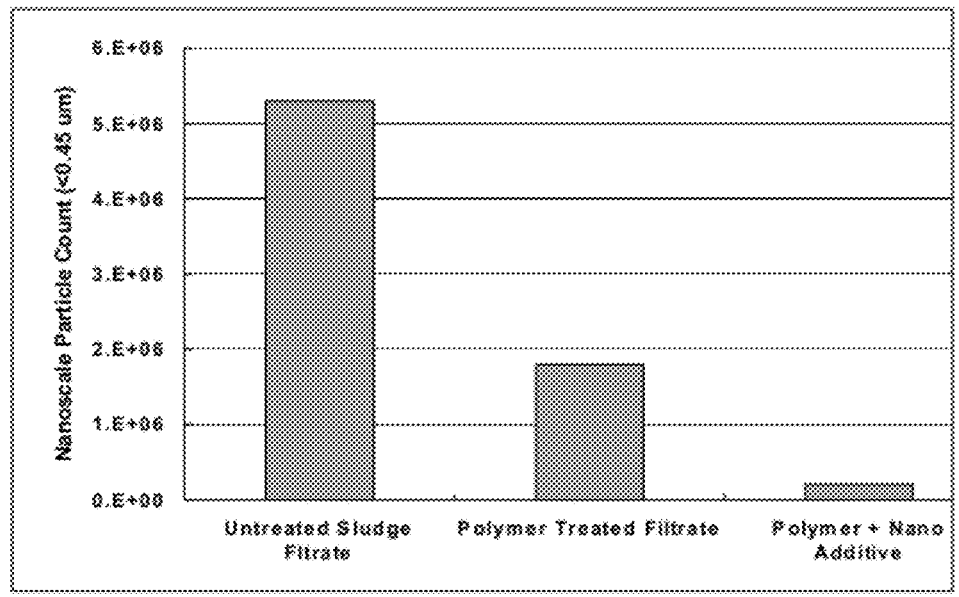
FIG. 1 shows biogenic submicron/nanoscale (<0.45 μm) particles count in the dewatered supernatants. Filtrate from raw anaerobic digested sludge, sludge dewatered at high shear conditions (500 rpm for 30 seconds) with traditional polymer-only approach as well as sludge dewatered using 1% nanoadditive and polymer were analyzed using a Beckman Coulter N4 Plus particle counter.

FIG. 1 shows the sub-micron/biogenic nanoscale particle count thus measured. The average number of particles in the untreated sludge filtrate was about $5.3 \times 10^6$ per unit volume. The total number of particles decreased to $1.8 \times 10^6$ when polymer alone was used for dewatering. In the polymer+nanoadditive treated samples, the number of submicron particles in the filtrate decreased to $2 \times 10^5$ per unit volume, which is about 90% lower than the number of sub-micron particles in the polymer treated samples. These results are consistent with the clear supernatant observed in sludge samples containing the nanoscale additives. This indicated that the nanoscale additives were significantly more effective in removing the sub-micron/nanoscale suspended particles, which are not typically removed by the conventional polymer-only treatment.

Example 2

An alumina nanoparticle dispersion was synthesized by dissolving 24.1 grams of Aluminum Chloride Hexahydrate (Aldrich 237078) in 500 mL of distilled water and stirred. A 0.25 M Sodium hydroxide solution was made using 10 grams of Sodium Hydroxide (Alfa S-31803) and 500 mL of distilled water. The Aluminum Chloride solution was then heated to 80° C. using a hot plate while continuously stirring. Once 80 degrees was reached, the sodium hydroxide solution was added via peristaltic pump at a rate of 5 cc/min. The solution remained stirring while base was being added. After all of the sodium hydroxide was added, the solution was left stirring and cooled down. The final pH of the material was 4.

Selinsgrove, Pa. wastewater treatment plant sludge (percent solids ~1.2%) was used. Polymer stock was prepared by adding about 5.2 g of cationic polymer (Ciba ZETAG® 8818) to 1000 g of RO water. A 0.9 wt % dispersion of nanoscale alumina was used. To replicate traditional dewatering, polymer was added to 500 ml of sludge to yield a dose of 22 lb/dry ton of solids. To represent high shear centrifuge, the polymer was mixed with the sludge at 500 rpm for 30 seconds. Subsequently, in order to represent lower shear centrifuge, the polymer was mixed at 200 rpm for 30 minutes and 45 rpm for 90 seconds. The predetermined optimum polymer dose for this mixing was 16 lb/dry ton solids. Finally, a nanoscale additive treatment was performed at a lower shear rate. For this treatment, the nanoadditive was added to the 500 ml sludge to yield a concentration of 4% (of the dry solids) and mixed at 200 rpm for 30 seconds, followed by polymer addition and mixing at 200 rpm for 30 seconds and 45 rpm for 90 seconds. The predetermined optimum polymer dose for this treatment is 10 lb/ton dry solids. Subsequently, 50 mL of sludge sample, mixed with various concentrations of additives and optimum dose of polymer was poured into the filtration apparatus, and a vacuum was immediately applied. The volumes filtered were recorded as a function of time until the free water was completely removed.

Cake solids collected from the filtration tests were placed on a pre-weighed tin, and immediately weighed to reduce the moisture loss. Samples were then dried at 105° C. for 2 hours, desiccated and weighed again. The difference in the mass between the two measurements yielded the moisture content (and hence, the % solids) of the dewatered sludge cake.

Figure 2:
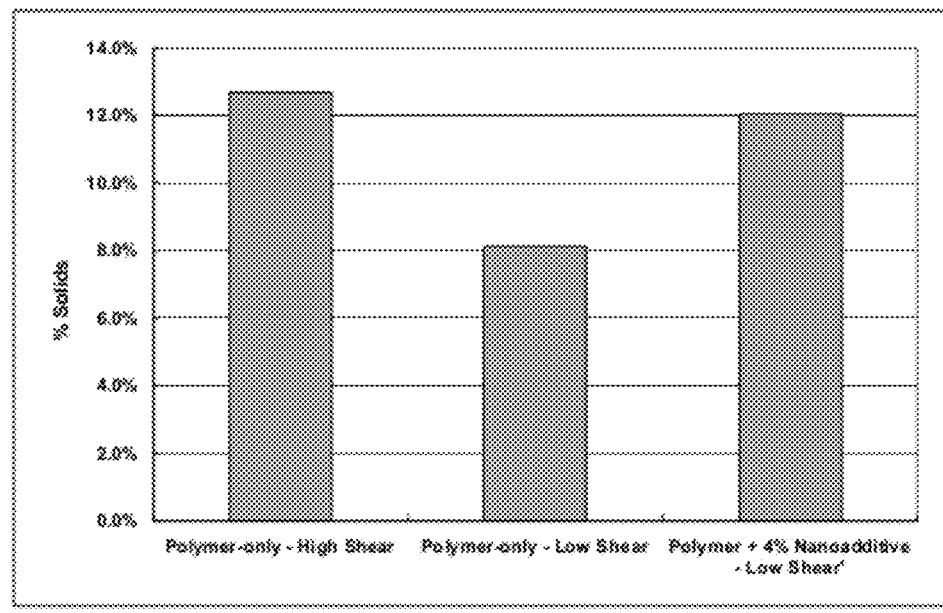
FIG. 2 shows percent solids in the dewatered cake from sludges dewatered using polymer only at high (500 rpm for 30 seconds) or lower shear (200 rpm for 30 seconds followed by 45 rpm for 90 seconds), and sludge dewatered at low shear conditions using 4% nanoadditives (200 rpm for 30 seconds) and polymer (200 rpm for 30 seconds followed by 45 rpm for 90 seconds).

FIG. 2 shows the percent solids in the cake solids from each test. The percent solids in the filtered cake from the traditional high shear polymer dose dewatering were ~12%. In the low shear polymer only treatment, the percent solids in the cake was only 8%. The percent solids in the dewatered cake from the lower shear test using nanoadditives and polymer is about 12%, which is approximately the same as that from high shear traditional dewatering. The nanoadditive-aided dewatering the percent solids from the lower shear dewatering test is about 12%, which is approximately the same as the high shear traditional dewatering. This indicated that, in this test, addition of nanoadditive yielded cake solids with the approximately same amount of percent solids at lower shear rates as the traditional high shear dewatering using polymer only treatment.

Example 3

An alumina nanoparticle dispersion was synthesized by dissolving 24.1 grams of Aluminum Chloride Hexahydrate (Aldrich 237078) in 500 mL of distilled water and stirred. A 0.25 M Sodium hydroxide solution was made using 10 grams of Sodium Hydroxide (Alfa S-31803) and 500 mL of distilled water. The Aluminum Chloride solution was then heated to 80° C. using a hot plate while continuously stirring. Once 80 degrees was reached, the sodium hydroxide solution was added via peristaltic pump at a rate of 5 cc/min. The solution remained stirring while base was being added. After all of the sodium hydroxide was added, the solution was left stirring and cooled down. The final pH of the material was 4.

Anaerobic digested sludge (percent solids ~1.2%) from Selinsgrove, Pa. wastewater treatment plant was used in this test. Polymer stock was prepared by adding about 5.2 g of cationic polymer (Ciba ZETAG® 8818) to 1000 g of RO water. A 0.9 wt % dispersion of nano alumina was used. Lower shear dewatering tests were performed using only the polymer and nanoadditive aided polymer addition. The polymer concentration was varied from 0 to 20 lb/ton dry solids in these studies. For dewatering studies using only the polymer, polymer was added to 500 ml sludge and mixed at 200 rpm for 30 seconds and 45 rpm for 90 seconds. For the nanoadditive-aided dewatering studies, the nanoadditive was added to the 500 ml sludge to yield a concentration of 4% (of the dry solids) and mixed at 200 rpm for 30 seconds, followed by polymer addition and mixing at 200 rpm for 30 seconds and 45 rpm for 90 seconds. Subsequently, 50 ml of the sludge was vacuum filtered and the supernatant was analyzed for submicron/biogenic nanoscale particle count.

Figure 3:
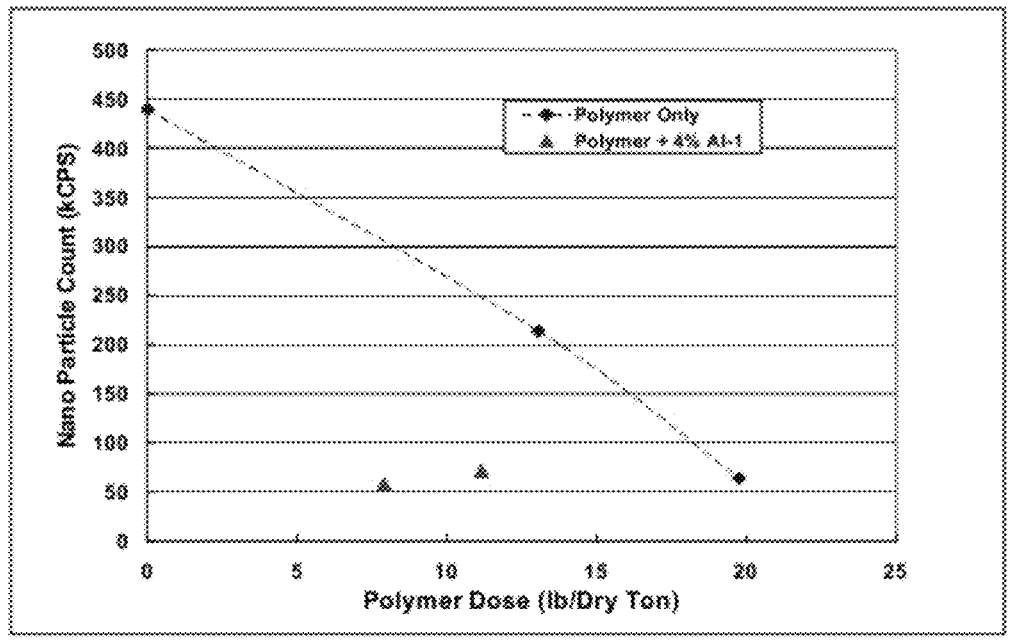
FIG. 3 shows biogenic submicron/nanoscale (<0.45 μm) particles count in the dewatered supernatants. Filtrate from sludge dewatered at lower shear conditions (200 rpm for 30 seconds followed by 45 rpm for 90 seconds) with traditional polymer-only approach as well as sludge dewatered using 4% nanoscale additive (200 rpm for 30 seconds) and polymer (200 rpm for 30 seconds followed by 45 rpm for 90 seconds) were analyzed using a Malvern Zetasizer—Nano particle counter. The photon count rates were measured to estimate relative particles count.

The biogenic nanoscale particle count in the supernatant was analyzed using a Zetasizer-Nano analyzer (Malvern Instruments, Westborough, Mass.). To estimate the particle count in a given volume of filtrate, the filtrate was directly transferred to a clean cell and the photon count rate was read to measure relative particle count in each sample. FIG. 3 shows the photon count rate in the polymer only and nanoadditive-aided polymer dewatering samples. A large amount of polymer (~20 lb/ton dry solids) was required to lower the photon count rate from 450 kilo count per second (kCPS) to nearly 50 kCPS. However, in the presence of 4% nanoadditive, polymer dose as low as 8 lb/ton dry solids was sufficient to lower the photon count rates to 50 kCPS. These data indicate that nanoscale additives effectively captured the biogenic sub-micron/nanoscale particles in the sludge there by lowering the centrifugation speed and polymer dose for dewatering.

Example 4

An alumina nanoparticle dispersion was synthesized by dissolving 24.1 grams of Aluminum Chloride Hexahydrate (Aldrich 237078) in 500 mL of distilled water and stirred. A 0.25 M Sodium hydroxide solution was made using 10 grams of Sodium Hydroxide (Alfa S-31803) and 500 mL of distilled water. The Aluminum Chloride solution was then heated to 80° C. using a hot plate while continuously stirring. Once 80 degrees was reached, the sodium hydroxide solution was added via peristaltic pump at a rate of 5 cc/min. The solution remained stirring while base was being added. After all of the sodium hydroxide was added, the solution was left stirring and cooled down. The final pH of the material was 4.

Return activated sludge (percent solids ~0.75%) from Selinsgrove, Pa. wastewater treatment plant was used in this test. Polymer stock was prepared by adding about 5.2 g of cationic polymer (Ciba ZETAG® 8818) to 1000 g of RO water. A 0.9 wt % dispersion of nano alumina was used. Lower shear dewatering tests were performed using only the polymer and nanoadditive aided polymer addition. The polymer concentration was varied from 0 to 2 lb/ton dry solids in these studies. For dewatering studies using only the polymer, polymer was added to 500 ml sludge and mixed at 200 rpm for 30 seconds and 45 rpm for 90 seconds. For the nanoadditive-aided dewatering studies, the nanoadditive was added to the 500 ml sludge to yield a concentration of 4% (of the dry solids) and mixed at 200 rpm for 30 seconds, followed by polymer addition and mixing at 200 rpm for 30 seconds and 45 rpm for 90 seconds. Subsequently, a capillary suction time (CST) analysis was performed on the polymer or "nanoadditive+polymer" added samples. The CST test has been a reliable method for evaluating sludge dewaterability (12). During this test, the sludge mass is filtered through a filter paper using vacuum pressure. The rate at which water permeates through the filter paper varies depending on the condition of the sludge and the filterability of the cake formed on the filter paper. The CST is the time required for the filtered water front to pass between two electrodes placed at a standard interval from the funnel. A lower CST for a sample indicates better dewatering characteristics of the sludge. Also, the polymer dose that produced minimum CST is considered the optimum polymer dose for dewatering the sludge sample (Novak and Lynch, 1990). During the CST evaluation, the polymer or "nanoadditive+polymer" mixed sludge was poured into a small open funnel (circular tube) resting on a Whatman #17 Chromatography paper according to Method 2710G of Standard Methods (12). Subsequently, the CST was measured using a Triton-Type 165 CST apparatus.

Figure 4:
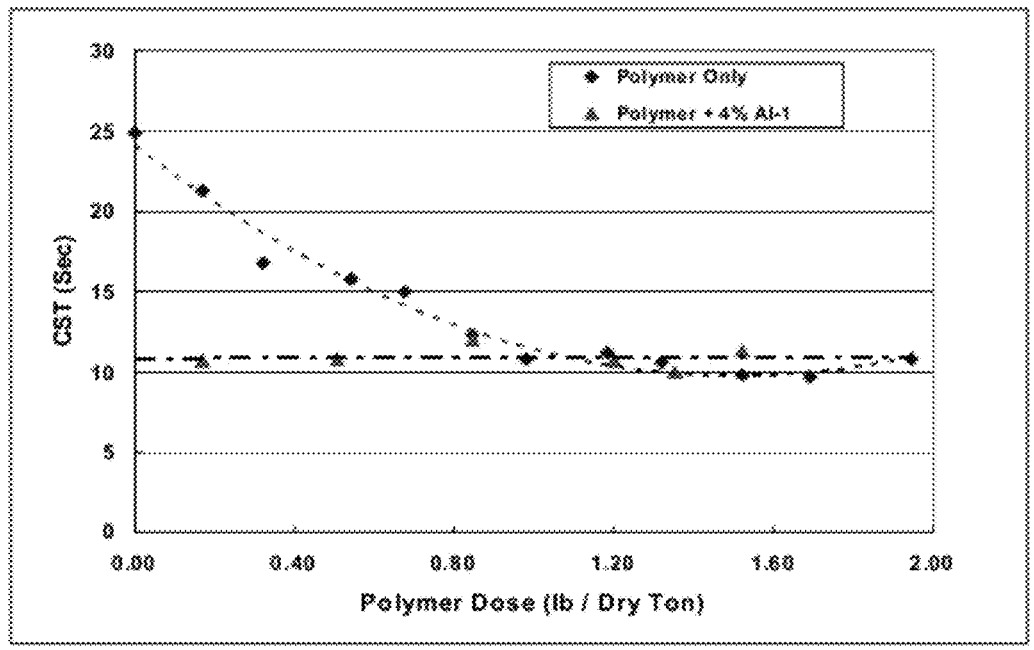
FIG. 4 is a graph showing capillary suction time (CST) for return activated sludge dewatered at lower shear conditions (200 rpm for 30 seconds followed by 45 rpm for 90 seconds) with traditional polymer-only approach as well as sludge dewatered using 4% nanoadditive (200 rpm for 30 seconds), and polymer (200 rpm for 30 seconds followed by 45 rpm for 90 seconds). CST was measured using a Triton-Type 165 CST apparatus.

FIG. 4 shows the CST values for polymer-only and "nanoadditive+polymer" added samples at different polymer doses. The data indicated that while nearly 1.2 lb polymer/ton dry solids was required to lower the CST to about 11 seconds, using polymer only treatment, the lowest amount of polymer used (~0.2 lb/ton dry solids) was sufficient to lower the CST to the same time when 4% of nanoadditive was used. This indicated that, addition of nanoadditives lowered the polymer demand for dewatering the return activated sludge. The lowering of polymer demand can be attributed to capture of biogenic submicron/nanoscale particles in the sludge by the nanoadditives.

Example 5

An alumina nanoparticle dispersion was synthesized by dissolving 24.1 grams of Aluminum Chloride Hexahydrate (Aldrich 237078) in 500 mL of distilled water and stirred. A 0.25 M Sodium hydroxide solution was made using 10 grams of Sodium Hydroxide (Alfa S-31803) and 500 mL of distilled water. The Aluminum Chloride solution was then heated to 80° C. using a hot plate while continuously stirring. Once 80 degrees was reached, the sodium hydroxide solution was added via peristaltic pump at a rate of 5 cc/min. The solution remained stirring while base was being added. After all of the sodium hydroxide was added, the solution was left stirring and cooled down. The final pH of the material was 4.

Anaerobic digested sludge (percent solids ~1.2%) from Selinsgrove, Pa. wastewater treatment plant was used in this test. Polymer stock was prepared by adding about 5.2 g of cationic polymer (Ciba ZETAG® 8818) to 1000 g of RO water. A 0.9% suspension of nano alumina was used. Lower shear dewatering tests were performed using only the polymer and nanoadditive aided polymer addition. The polymer concentration was varied from 0 to 20 lb/ton dry solids in these studies. For dewatering studies using only the polymer, polymer was added to 500 ml sludge and mixed at 200 rpm for 30 seconds and 45 rpm for 90 seconds. For the nanoadditive-aided dewatering studies, the nanoadditive was added to the 500 ml sludge to yield a concentration of 4% (of the dry solids) and mixed at 200 rpm for 30 seconds, followed by polymer addition and mixing at 200 rpm for 30 seconds and 45 rpm for 90 seconds. Subsequently, a capillary suction time (CST) analysis was performed on the polymer or "nanoadditive+polymer" added samples. The polymer or "nanoadditive+polymer" mixed sludge was poured into a small open funnel (circular tube) resting on a Whatman #17 Chromatography paper according to Method 2710G of Standard Methods (13). Subsequently, the CST was measured using a Triton-Type 165 CST apparatus.

Figure 5:
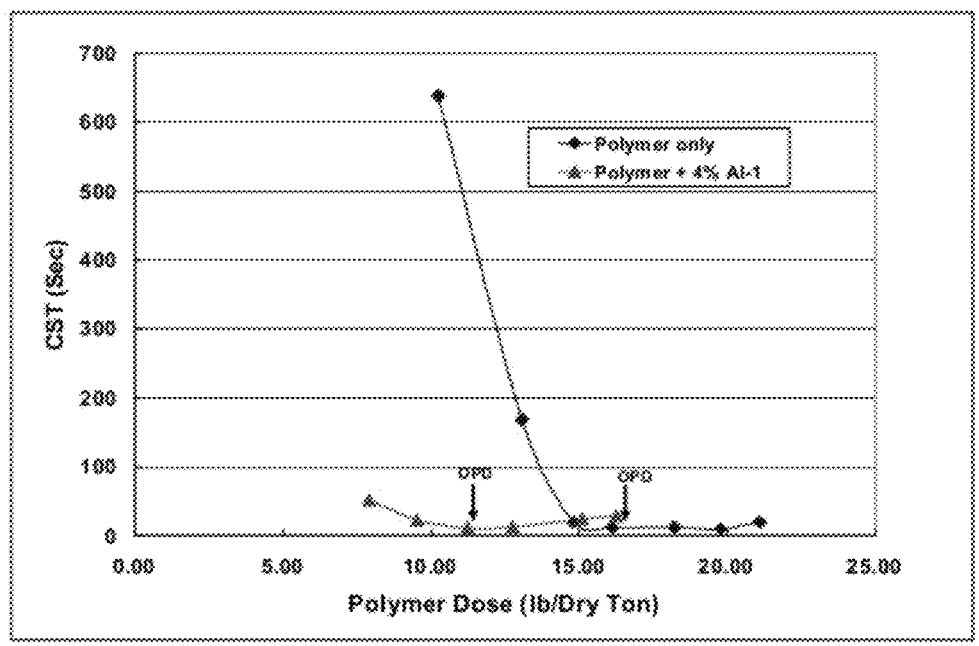
FIG. 5 is a graph showing capillary suction time (CST) for anaerobic sludge dewatered at lower shear conditions (200 rpm for 30 seconds followed by 45 rpm for 90 seconds) with traditional polymer-only approach as well as sludge dewatered using 4% nanoadditive (200 rpm for 30 seconds) and polymer (200 rpm for 30 seconds followed by 45 rpm for 90 seconds). CST was measured using a Triton-Type 165 CST apparatus.

FIG. 5 shows the CST values for polymer-only and "nanoadditive+polymer" added samples at different polymer doses. The data indicated that while nearly 16 lb polymer/ton dry solids was required to lower the CST to about 11 seconds, using polymer only treatment, ~10 lb/ton dry solids) was sufficient to lower the CST to the same time, when 4% of nanoadditive was used. This indicated that, addition of nanoadditives lowered the polymer demand for dewatering the return activated sludge. The lowering of polymer demand can be attributed to capture of biogenic submicron/nanoscale particles in the sludge by the nanoadditives.

Example 6

An alumina nanoparticle dispersion was synthesized by dissolving 24.1 grams of Aluminum Chloride Hexahydrate (Aldrich 237078) in 500 mL of distilled water and stirred. A 0.25 M Sodium hydroxide solution was made using 10 grams of Sodium Hydroxide (Alfa S-31803) and 500 mL of distilled water. The Aluminum Chloride solution was then heated to 80° C. using a hot plate while continuously stirring. Once 80 degrees was reached, the sodium hydroxide solution was added via peristaltic pump at a rate of 5 cc/min. The solution remained stirring while base was being added. After all of the sodium hydroxide was added, the solution was left stirring and cooled down. The final pH of the material was 4.

Return activated sludge (percent solids ~0.75%) from Selinsgrove, Pa. wastewater treatment plant was used in this test. Polymer stock was prepared by adding about 5.2 g of cationic polymer (Ciba ZETAG® 8818) to 1000 g of RO water. A 0.9 wt % dispersion of nano alumina was used. Lower shear dewatering tests were performed using only the polymer and nanoadditive aided polymer addition. The polymer concentration was varied from 0 to 2 lb/ton dry solids in these studies. For dewatering studies using only the polymer, polymer was added to 500 ml sludge and mixed at 200 rpm for 30 seconds and 45 rpm for 90 seconds. For the nanoadditive-aided dewatering studies, the nanoadditive was added to the 500 ml sludge to yield a concentration of 2% (of the dry solids) and mixed at 200 rpm for 30 seconds, followed by polymer addition and mixing at 200 rpm for 30 seconds and 45 rpm for 90 seconds.

Subsequently, 50 mL of sludge sample, mixed with various concentrations of additives and optimum dose of polymer was poured into the filtration apparatus, and a vacuum was immediately applied. The volumes filtered were recorded as a function of time until the free water was completely removed.

Cake solids collected from the filtration tests were placed on a pre-weighed tin, and immediately weighed to reduce the moisture loss. Samples were then dried at 105° C. for 2 hours, desiccated and weighed again. The difference in the mass between the two measurements yielded the moisture content (and hence, the % solids) of the dewatered sludge cake.

Figure 6:
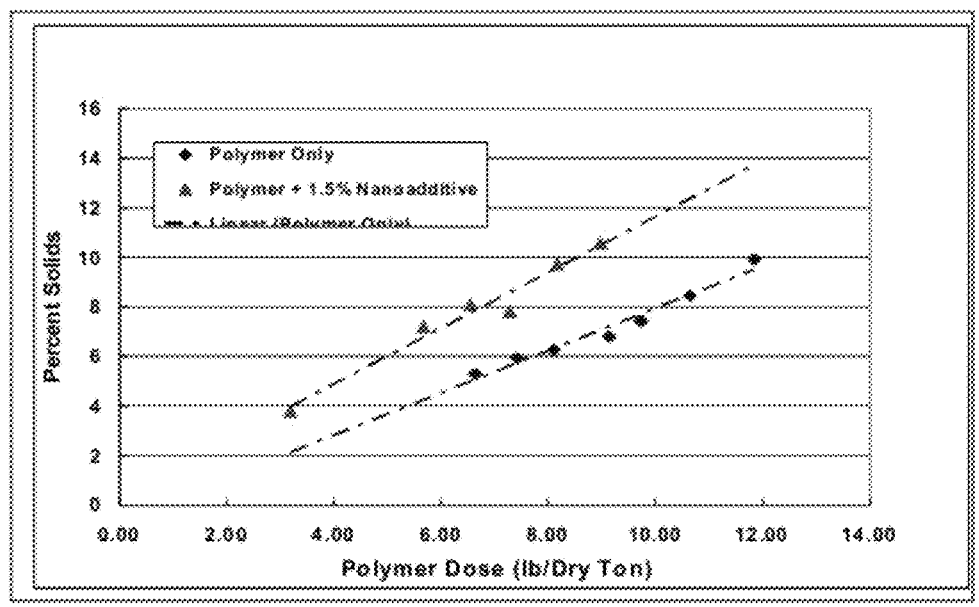
FIG. 6 shows percent solids in the dewatered cake from return activated sludge dewatered using polymer only at lower shear (200 rpm for 30 seconds followed by 45 rpm for 90 seconds), and sludge dewatered at low shear conditions using 1.5% nanoadditives (200 rpm for 30 seconds) and polymer (200 rpm for 30 seconds followed by 45 rpm for 90 seconds).

FIG. 6 shows the percent solids in the dewatered cake solids at different polymer doses, with or without the addition of 1.5% nanoadditive. For any given polymer dose, compared to the polymer-only treatment, the percent solids in dewatered cake of the nanoadditive added sludge was about 30 to 55% higher. The increase in solids content is attributed to more efficient capture of biogenic submicron/nanoscale particles in the sludge by the nanoadditive (FIG. 4, where 4% nanoadditive is used provides an example).

The invention has been described with respect to preferred embodiments. However, as those skilled in the art will recognize, modifications and variations in the specific details which have been described and illustrated may be resorted to without departing from the spirit and scope of the invention.

We claim:

1. A method for improving the dewatering of sludge from a wastewater treatment plant comprising the steps of:
    a) adding nanoparticles having a size of less than 40 nm and a net positive charge to the sludge;
    b) adding a cationic polymer to the mixture of sludge and nanoparticles; and
    c) dewatering the mixture of sludge, nanoparticles and the cationic polymer.

2. The method of claim 1 wherein the nanoparticles have a size between 1 and 30 nm.

3. The method of claim 1 wherein the nanoparticles comprise metal oxide nanoparticles.

4. The method of claim 1 wherein the nanoparticles are selected from the group of: aluminum oxide, iron oxide, zinc oxide, zirconium oxide, copper oxide, magnesium oxide, nickel oxide, cobalt oxide, manganese oxide, titanium oxide and cationic clay.

5. The method of claim 1 wherein the dewatering the mixture of sludge, nanoparticles and the cationic polymer comprises high shear centrifuging.

6. The method of claim 1 wherein the dewatering the mixture of sludge, nanoparticles and the cationic polymer comprises low shear centrifuging.

7. The method of claim 1 wherein the nanoparticles are added prior to the addition of the cationic polymer.

8. The method of claim 1 wherein the nanoparticles were synthesized from Aluminum Chloride Hexahydrate and Sodium hydroxide.

9. An additive for improving the dewatering of sludge from a wastewater treatment, for use with a cationic polymer, comprising nanoparticles having a size of less than 40 nm and have a net positive charge.

10. The additive as claimed in claim 9 wherein the nanoparticles have a size between 1 and 30 nm.

11. The additive as claimed in claim 9 wherein the nanoparticles comprise metal oxide nanoparticles.

12. The additive as claimed in claim 9 wherein the nanoparticles are selected from the group of: aluminum oxide, iron oxide, zinc oxide, zirconium oxide, copper oxide, magnesium oxide, nickel oxide, cobalt oxide, manganese oxide, titanium oxide and cationic clay.

13. The additive as claimed in 9 wherein the nanoparticles were synthesized from Aluminum Chloride Hexahydrate and Sodium hydroxide.

* * * * *